United States Patent
Bartlik et al.

(10) Patent No.: US 10,003,293 B2
(45) Date of Patent: Jun. 19, 2018

(54) PORTABLE MOTOR DRIVE SYSTEM

(71) Applicants: Andrew John Bartlik, North Salem, NY (US); Charles Thomas McLees, Jr., Liberty, NC (US)

(72) Inventors: Andrew John Bartlik, North Salem, NY (US); Charles Thomas McLees, Jr., Liberty, NC (US)

( * ) Notice: Subject to any disclaimer, the term of this patent is extended or adjusted under 35 U.S.C. 154(b) by 797 days.

(21) Appl. No.: 13/841,766

(22) Filed: Mar. 15, 2013

(65) Prior Publication Data

US 2014/0265946 A1 Sep. 18, 2014

(51) Int. Cl.
*H02P 27/04* (2016.01)
*H02P 23/00* (2016.01)

(52) U.S. Cl.
CPC .......... *H02P 27/04* (2013.01); *H02P 23/0004* (2013.01)

(58) Field of Classification Search
CPC ............................. H02P 27/04; H02P 23/0004
USPC ................... 318/701, 802; 320/116; 324/429
See application file for complete search history.

(56) References Cited

U.S. PATENT DOCUMENTS

| | | | | |
|---|---|---|---|---|
| 4,647,835 A * | 3/1987 | Fujikawa | ................ | F02B 63/04 290/1 B |
| 4,943,760 A * | 7/1990 | Byrne et al. | ................ | 318/701 |
| 5,119,010 A * | 6/1992 | Shirata et al. | ................ | 320/110 |
| 5,146,148 A * | 9/1992 | Voet | ................ | 318/803 |
| 5,482,446 A * | 1/1996 | Williamson | ........ | A61M 5/142 417/234 |
| 5,522,707 A * | 6/1996 | Potter | ................ | B23Q 11/1038 417/4 |
| 5,629,590 A * | 5/1997 | Yamamoto | ........ | G08C 17/02 318/16 |
| 5,710,504 A * | 1/1998 | Pascual et al. | ................ | 180/65.8 |
| 6,043,617 A * | 3/2000 | Matsumoto | ............. | H02P 21/09 180/65.51 |
| 6,484,830 B1 * | 11/2002 | Gruenwald | ............. | B60K 6/28 180/65.245 |
| 7,075,268 B2 * | 7/2006 | Wills | ............. | H02P 27/04 318/800 |
| 7,710,053 B2 * | 5/2010 | Tan | ............. | H02P 1/029 318/277 |
| 2003/0088338 A1 * | 5/2003 | Phillips | ............. | B67D 1/1204 700/282 |

(Continued)

FOREIGN PATENT DOCUMENTS

DE 19809712 A1 * 9/1998 ................ H02P 5/74

*Primary Examiner* — Bentsu Ro
*Assistant Examiner* — Devon Joseph
(74) *Attorney, Agent, or Firm* — Gerald E. Hespos; Michael J. Porco; Adam Hotzoglou (57) ABSTRACT

Systems and methods for driving a motor are provided. One implementation of a drive system comprises a user interface, a variable speed drive, and a controller. The user interface enables a user to select an operating frequency set point and an operating voltage set point. The operating frequency set point is selected from a range of frequency set points and the operating voltage set point is selected from a range of voltage set points. The variable speed drive is configured to drive a motor at the selected operating frequency set point and selected operating voltage set point. The controller is configured to receive input from the user interface and control the operating frequency and operating voltage of the variable speed drive.

20 Claims, 7 Drawing Sheets

(56) References Cited

U.S. PATENT DOCUMENTS

| | | | |
|---|---|---|---|
| 2003/0154041 A1* | 8/2003 | McGaughey | H02P 21/18 702/75 |
| 2004/0080862 A1* | 4/2004 | Miyata | G11B 21/083 360/78.05 |
| 2004/0226614 A1* | 11/2004 | Lane | E03B 7/071 137/487.5 |
| 2004/0240101 A1* | 12/2004 | Inaji | G11B 5/5582 360/77.02 |
| 2005/0105226 A1* | 5/2005 | Bedard | H02J 7/345 361/62 |
| 2005/0118030 A1* | 6/2005 | Kline | A61M 1/3693 417/18 |
| 2005/0126635 A1* | 6/2005 | Addink | G05D 7/0635 137/487.5 |
| 2005/0151011 A1* | 7/2005 | Tartaglia | B64F 1/02 244/110 A |
| 2006/0174707 A1* | 8/2006 | Zhang | G01M 3/243 73/592 |
| 2006/0232237 A1* | 10/2006 | Jadot | H02P 21/16 318/799 |
| 2007/0035907 A1* | 2/2007 | Doering | A01G 25/162 361/160 |
| 2007/0194759 A1* | 8/2007 | Shimizu | H02J 7/0016 320/166 |
| 2008/0187298 A1* | 8/2008 | Holden | F04B 49/06 388/811 |
| 2008/0217443 A1* | 9/2008 | Zacherl | F04D 15/0066 239/722 |
| 2008/0288115 A1* | 11/2008 | Rusnak | F04D 15/0066 700/282 |
| 2009/0045684 A1* | 2/2009 | Ma | F02B 63/04 310/50 |
| 2009/0250276 A1* | 10/2009 | Goodwin | B60K 6/28 180/65.265 |
| 2009/0261761 A1* | 10/2009 | Yoshioka | B60L 3/003 318/139 |
| 2010/0202069 A1* | 8/2010 | Lyden | H02P 23/0077 359/824 |
| 2010/0271035 A1* | 10/2010 | Heo | G01R 31/362 324/429 |
| 2010/0310382 A1* | 12/2010 | Kidd | F04D 13/08 417/12 |
| 2010/0315034 A1* | 12/2010 | Lu | H02P 23/0077 318/802 |
| 2011/0044823 A1* | 2/2011 | Stiles | F04B 49/20 417/42 |
| 2011/0080133 A1* | 4/2011 | Tamburrino | B60L 11/1851 320/101 |
| 2011/0091329 A1* | 4/2011 | Stiles, Jr. | F04B 49/20 417/1 |
| 2011/0175006 A1* | 7/2011 | Dolenti | F16K 31/04 251/129.11 |
| 2011/0181431 A1* | 7/2011 | Koehl | F04D 15/0088 340/660 |
| 2012/0025768 A1* | 2/2012 | Nakano et al. | 320/116 |
| 2012/0079880 A1* | 4/2012 | Freitag | F25B 45/00 73/198 |
| 2012/0175536 A1* | 7/2012 | Hanson | F16K 37/0083 251/129.01 |
| 2014/0021886 A1* | 1/2014 | Kurosawa | H02P 25/028 318/135 |
| 2014/0069508 A1* | 3/2014 | Minervini | F16K 37/0091 137/2 |
| 2014/0264111 A1* | 9/2014 | Porter | F16K 17/36 251/129.03 |
| 2015/0328971 A1* | 11/2015 | Hwang | F16H 3/00 475/5 |

* cited by examiner

FIG. 1

NORMAL VALVE OPERATION

HAMMER BLOW OPERATION

FIGURE 4
CAPACITOR PRECHARGE MODE

FIGURE 5
READY MODE

FIGURE 6
VALVE
RUNNING MODE

FIGURE 7
VALVE
TORQUE MODE

PORTABLE MOTOR DRIVE SYSTEM

BACKGROUND

Field

The present disclosure relates generally to systems and devices for use during electrical power loss, and more particularly, to a portable motor drive system and methods thereof.

Description of the Related Art

Motor-operated valves are typically run from larger fixed power supplies referred to as motor control centers. A starting contactor, which applies motive power to a valve motor, is closed by the valve control circuits, allowing the valve to move. To prevent operation of the valve beyond the full open or full closed position, the end of travel is typically sensed by pre-set torque and/or limit switches, wired into the control circuit. These switches change state when the end of travel is reached, resulting in the starting contactor changing state, which will de-energize the valve motor and stop valve travel. If AC power is not available to the motor control center, it is not possible to remotely operate the valve. This may happen in various emergency situations or during plant maintenance.

SUMMARY

A portable motor drive system and methods thereof are provided. In some embodiments, a drive system may comprise a user interface, a variable speed drive, and a controller. The user interface enables a user to select an operating frequency set point and an operating voltage set point. The operating frequency set point is selected from a range of frequency set points and the operating voltage set point is selected from a range of voltage set points. The variable speed drive is configured to drive a motor at the selected operating frequency set point and selected operating voltage set point. The controller is configured to receive input from the user interface and control the operating frequency and operating voltage of the variable speed drive.

The present disclosure further describes power supplies, in which one implementation comprises of only a battery, and in another implementation comprises a battery, a capacitor, a pre-charge contact, and a capacitor switching contact. The capacitor is configured to be coupled to the battery during a charging mode and is configured to store a charge during the charging mode. The pre-charge contact is configured to switchably couple the battery to the capacitor during the charging mode. The capacitor switching contact is configured to switchably couple the capacitor to a motor drive during a powering mode.

Other implementations include a power supply that comprises a battery and a plurality of capacitors. The battery is configured to pre-charge the capacitors when the capacitors are in parallel. The capacitors are configured to provide power to a motor drive when the capacitors are in series.

BRIEF DESCRIPTION OF THE DRAWINGS

The above and other aspects, features, and advantages of the present disclosure will become more apparent in light of the following detailed description when taken in conjunction with the accompanying drawings.

To facilitate understanding, identical reference numerals have been used, where possible, to designate identical elements that are common to the figures, except that alpha-numerical suffixes may be added, when appropriate, to differentiate such elements. The images in the drawings are simplified for illustrative purposes and are not depicted to scale.

The appended drawings illustrate exemplary embodiments of the present disclosure and, as such, should not be considered as limiting the scope of the disclosure that may admit to other equally effective embodiments. Correspondingly, it has been contemplated that features or steps of one embodiment may beneficially be incorporated in other embodiments without further recitation.

In some embodiments, particular method steps of the discussed methods are performed in the depicted order. In alternate embodiments, in the respective methods, at least two method steps or portions thereof may be performed contemporaneously, in parallel, or in a different order.

DETAILED DESCRIPTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces, programmable logic or other device or devices.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage, programmable logic or other device or devices.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The word "exemplary" is used herein to mean "serving as an example, instance, or illustration." Any configuration or design described herein as "exemplary" is not necessarily to be construed as preferred or advantageous over other configurations or designs. Herein, the phrase "coupled with" is defined to mean directly connected to or indirectly connected with through one or more intermediate components. Such intermediate components may include both hardware and software based components.

Large valves may be used control the flow of fluids in systems such as nuclear reactors, oil rigs, water management plants, etc. In emergency conditions, such as when a power outage occurs, the valves may need to be opened or closed using alternative methods. According to some embodiments of the present disclosure, portable motor drives may be used for this purpose. The portable motor drives may be portable battery powered devices that are capable of operating AC motor operated valves. The portable motor drives may be designed to be "man portable", or moveable by a single person, to allow deployment/use during emergency events of damage to a plant infrastructure, including, for example, hoists and elevators. The portable motor drive is basically an inverter, which is designed to operate at a frequency other than 60 Hz, commonly referred to as a Variable Speed Drive (VSD).

The following describes the general principles of operation of such a portable motor drive. The torque developed by a motor depends on both the frequency and voltage. Holding all other factors constant, the torque generated by a motor varies roughly in proportion to the ratio square of the voltages, or:

$$T2 = T1 \times (V2/V1)^2$$

An increase in voltage, results in an increase in torque.

The torque generated by a motor varies in proportion to the ratio square of the frequencies as well and can be found by the following:

$$T2 = T1 \times (f1/f2)^2$$

However, an increase in frequency results in a DECREASE in torque.

If both voltage and frequency are varied simultaneously, while maintaining the ratio of frequency and voltage, these two effects cancel each other out, and the torque generated by the motor would remain unchanged.

According to the principles of the present disclosure, the portable motor drive takes advantage of this effect by operating the motor at a lower frequency, thereby allowing the motor to develop full torque at a lower AC operating voltage than normally required by the motor. The reduction in AC operating voltage in turn allows a reduction in the DC voltage powering the VSD.

The torque required to spin a valve is largely independent of the speed of travel. As such, the work required to close the valve does not change with the frequency of operation. However, the frequency of operation directly affects the closure time. As a reduction in frequency increases the time it takes to close the valve and the work to close the valve remains unchanged, reducing the frequency reduces the power required to close the valve. This reduces the DC power (amps) required to operate the system, which in turn affects the size/weight of the DC power supply.

The DC power to operate the VSD comes from high capacity/high current batteries (or alternate DC sources (shown on FIGS. 4 through 9)). The DC system operating voltage needs to be higher than the selected AC operating voltage of the motor, and can be on the order of 400 volts. The high current demand requires relatively large batteries, while the high voltage requires a large number of cells. These two effects require the battery pack to be relatively large. One vendor system uses a battery which weighs 60 lbs.

Figure 1:
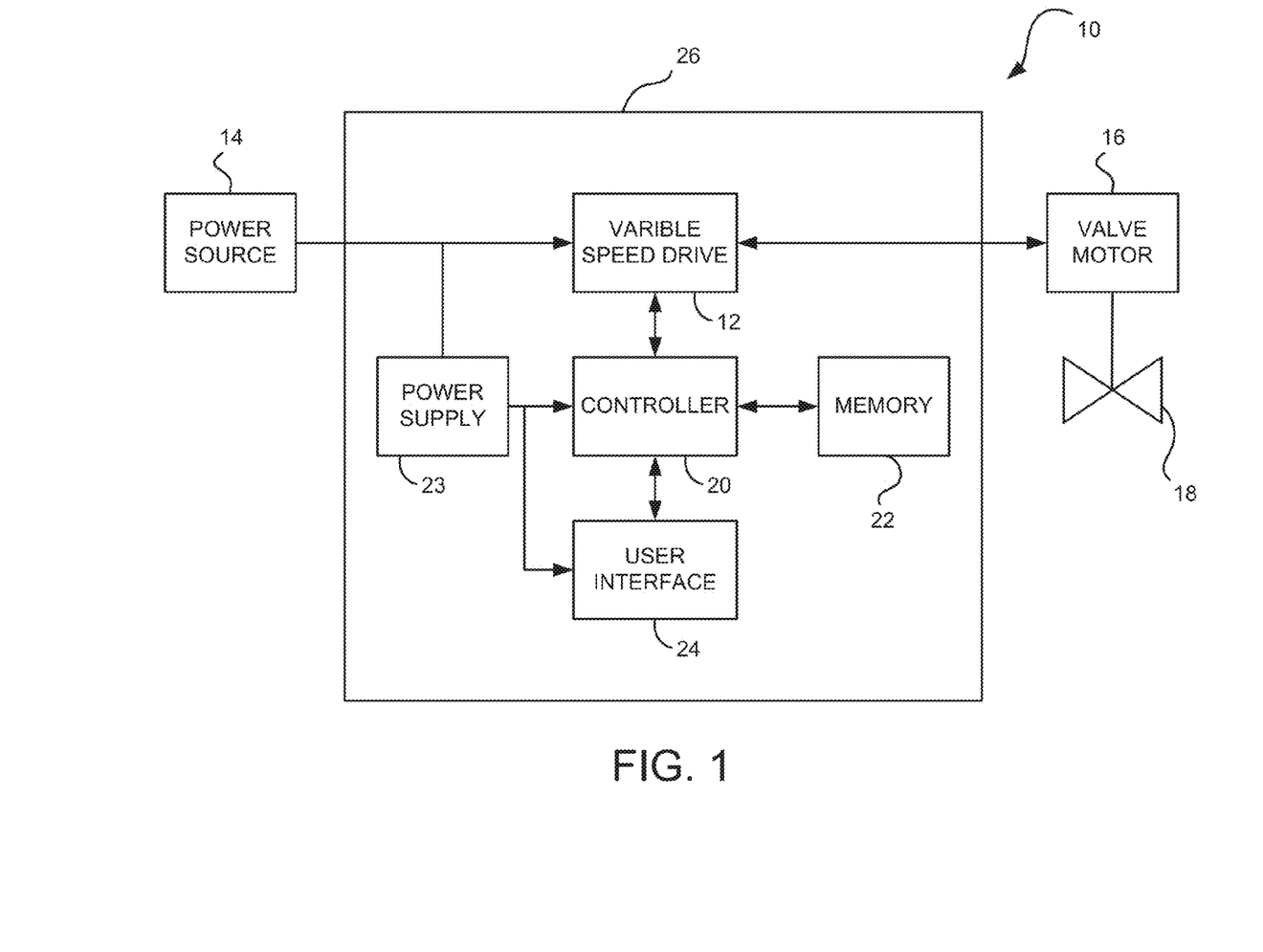
FIG. 1 is a block diagram of a portable motor drive system in accordance with an embodiment of the present disclosure.

Referring to FIG. 1, a portable motor drive system 10 of the present disclosure is illustrated. As an example, the portable motor drive system 10 may be used in the event of a loss of power, loss of infrastructure, or other disaster. Such disasters may be the result of natural causes, such as hurricanes, tornadoes, earthquakes, etc. The portable motor drive system 10 can be used to provide large amounts of power from a relatively small, portable unit. The portable motor drive system 10 is capable of operating critical AC powered valves, in response to major plant disturbances, such as those that occurred at Fukushima. The system 10 may also be useful to operate critical valves in the petrochemical industry, military or in civil applications, such as in response to other recent disasters, such as Hurricane Sandy and Hurricane Katrina.

The portable motor drive system 10 includes a variable speed drive (VSD) 12 configured to receive power from a power source 14 and provide the power to a valve motor 16 or actuator of a valve 18. The system 10 further includes a controller 20 configured to control the VSD 12 based on various conditions and the type of valve actuator 16 to be controlled, the details of which will be described below. In some embodiments, the VSD 12 and controller 20 are configured as one unit. A memory 22 is coupled to the controller 20 configured to store programmable instructions and data for the controller 20, for example, torque curves for particular values, etc. A power supply 23 may be provided to receive power from the power source 14 and convert or transform the incoming power to a level appropriate for certain components, e.g., 5 VDC. In some embodiments, the power supply 23 may be a battery, such as a 24 volt battery, for providing power to the controller 20 and user interface 24.

Additionally, the system 10 includes a user interface 24, e.g., a multimedia user interface, configured to receive instructions from an operator and to provide and display data to the operator. The variable speed drive 12, controller 20, memory 22 and user interface 24 are disposed in a portable housing 26, which may be configured as a rugged suitcase-type housing including, for example, wheels, rollers, etc., to facilitate movement of the system 10. In the above embodiment, the power source 14, e.g., at least one battery or other DC source, may also be disposed in the portable housing 26. In another embodiment, the housing 26 is configured as a backpack for the system 10 to be carried by an individual operator. In this embodiment, the power source 14, e.g., at least one battery or other DC source, may also be configured as a backpack to be carried by an individual operator.

The user interface 24 allows a user to select a combination of voltage set points and frequency set points to control the torque applied to the valve. The memory 22 may be configured to store multiple pairs of voltage set points and frequency set points. The controller applies the selected set points to adjust the operations of the VSD 12. The user may select the voltage-frequency pairs based on the type of valve to be operated. Information about the valve and operating parameters may be stored in the memory 22 or in a separate database. In some embodiments, the user may simply enter an identity of the valve to be controlled and the controller 20 can search the memory 22 for the appropriate operating voltage and frequency.

Torque can be controlled by limiting the output voltage of the VSD 12. The torque generated by a motor 16 is related to the amps passing through the stator. The portable motor drive system 10 may limit torque developed by a motor 16 by controlling the maximum current delivered to the motor 16, and automatically shutting the unit off when a target current is reached. This approach can be an effective way to limit the maximum torque developed by the motor 16. However, due to the speed that the current increases as the valve 18 begins to torque down, this approach is subject to current overshoot, and may be subject to electronic noise shutting the portable drive prematurely.

An alternate approach to directly limiting current to limit torque is to indirectly limit current by limiting output voltage of the portable drive. For typical motors, the torque developed by the motor is roughly proportional to the square of the voltage. Knowing the rated torque of a motor at rated voltage, the torque developed by this motor at an alternate voltage can be predicted fairly accurately. This principle could be used to limit the torque developed by a motor by limiting the output voltage of the portable motor drive system 10.

Although this relationship may not be exact, by measuring the performance of a particular motor at various terminal voltages and frequencies, an accurate relationship between terminal voltage and the torque developed by the motor could be developed. The relationship between torque and terminal voltage may be preprogrammed into the memory 22 of the portable motor drive system 10, for precise torque control, without the use of external torque switches.

When the load on a motor increases, the speed of the motor begins to slow. However, the operating frequency of the system remains the same. It is a property of AC induction motors that when the "speed difference" between the magnetic field and the rotor increases, more current is drawn, generating more power. The speed difference between a rotor and the magnetic field may also be referred to as "slip." The VSD senses this increase in current as a decrease in AC output voltage from the VSD to the AC induction motor. To restore output voltage to the target (i.e., motor 16), current is applied through current diodes of the VSD more frequently and/or for a longer period, allowing more current to reach the AC output bus, restoring AC bus voltage.

The maximum output voltage of the system is directly related to the DC bus voltage, with peak AC voltage equal to DC bus voltage. Typically AC voltage is expressed in terms of its RMS value. Assuming a perfect sine wave, with peak AC voltage equal to DC bus voltage, the maximum AC voltage would be equal to the DC voltage divided by the square root of 2.

However, the portable motor drive is able to set the output voltage at any voltage up to the maximum voltage. As the torque developed by the motor is limited by the AC voltage supplied it, this feature may be used to limit the torque developed by the motor.

The speed of operation of the valve is directly related to the frequency of the AC power feeding the valve. As the speed of operation directly affects the power required to operate the valve, the frequency of operation is set below the normal operating frequency (60 Hertz), to limit the power requirements of the system.

The frequency selected will depend on the particular application, with the optimum operating point determined experimentally or analytically, but initial experiment indicate an operating frequency of 20 Hz provided acceptable result.

A VSD has very accurate current devices called Hall effect sensors, which are primarily used by the VSD to control the shape of the AC sine wave. It is to be appreciated that the VSD includes a PWM (pulse width modulated) power stage and as such creates an average voltage waveform from switching a high voltage DC to create a current sine wave. Various types of transistors may be employed to the voltage switching. The Hall effect sensors provide feedback to the controller 20 to indicate where the current should be on the sine wave at any instant. The Hall effect sensors can also be used to monitor current for other functions.

The controller 20 is configured to operatively receive instructions from the user interface 24 and to control the operations of the VSD 12 based on instructions, curves, etc., stored in the memory 22. In some embodiments, the controller 20 may be a central processing unit (CPU), microcomputer, digital signal processor (DSP), application specific integrated circuit (ASIC), a field programmable gate array (FPGA), etc.

The multimedia user interface 24 is configured for interacting with a user and for communicating events, such as alarms and instructions to the user. The multimedia user interface 24 may include touch sensitive buttons or sensors and a display for providing visual indications to the user. The display may be embodied as a touch screen, a liquid crystal display (LCD), a plurality of LED number segments, individual light bulbs or any combination. The display may further be embodied as an electronic paper (e-paper) or electronic ink (e-ink) display using various technologies such as Gyricon, electrophoretics, electrowetting, electrofluidics, interferometric modulators and other to be developed technologies. The display may provide information to the user in the form of alpha-numeric lines, computer-generated graphics, videos, animations, etc. The multimedia user interface 24 further includes a speaker or audible output means for audibly producing instructions, alarms, data, etc. The speaker is coupled to the controller 20 via a digital-to-analog converter (D/A) for converting digital audio files stored in the memory 22 to analog signals playable by the speaker.

The memory 22 may include a volatile memory and/or a non-volatile memory. The volatile memory includes internal storage memory, e.g., random access memory (RAM), and the non-volatile memory includes removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, the system can be easily upgraded as needed.

Figure 2:
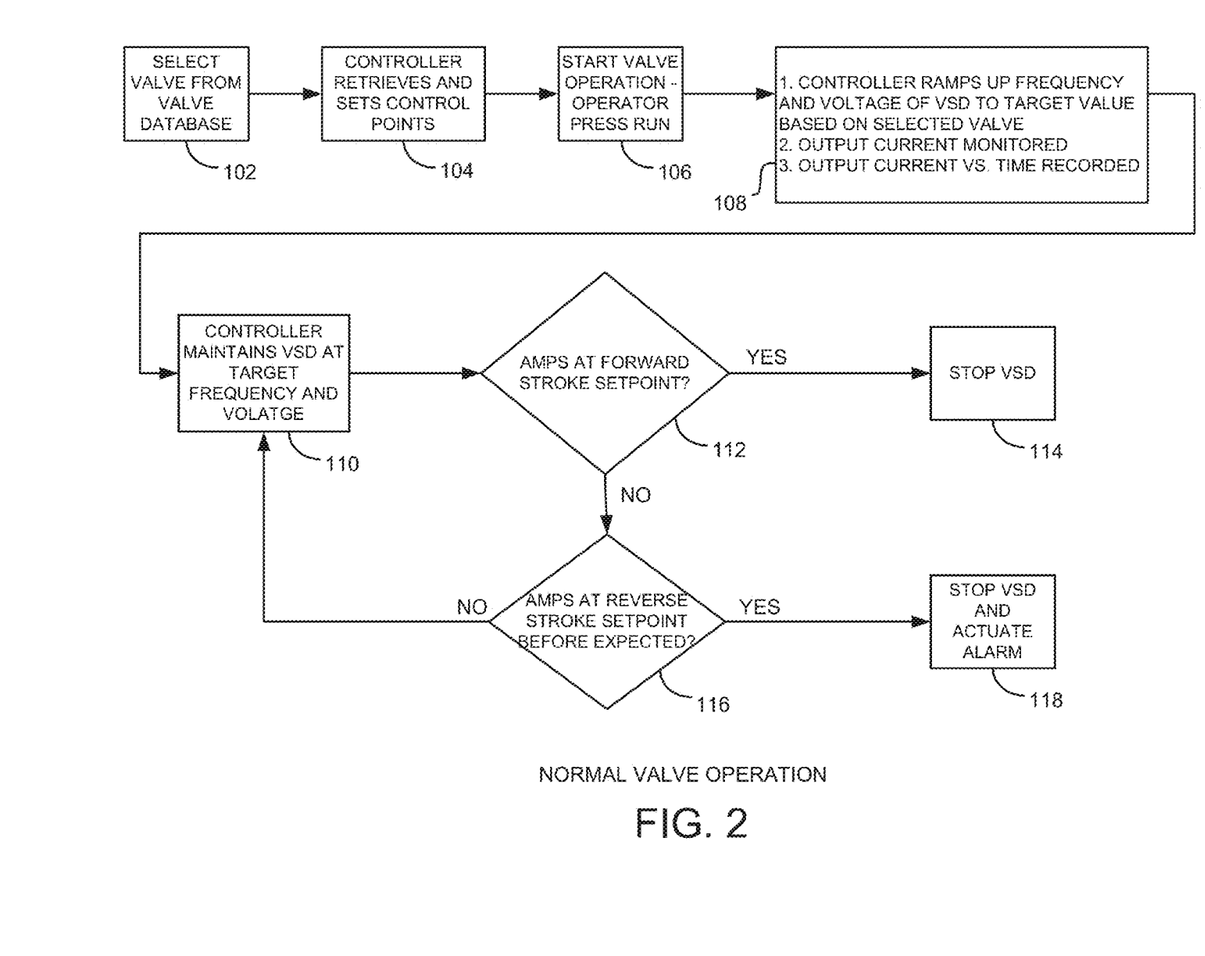
FIG. 2 is a flow chart illustrating an operation of the portable motor drive system in accordance with an embodiment of the present disclosure.

Referring to FIG. 2, a flow chart illustrating an operation of the portable motor drive system in accordance with an embodiment of the present disclosure is provided. Initially, in step 102, a valve is selected from the valve database via user interface 24. The controller 20 retrieves from memory 22 control set points for the selected valve, step 104. Next, in step 106, the user interface prompts the user to start the operation of operating the valve.

In step 108, the controller 20 sends at least one control signal to the VSD 12 to ramp up the frequency and voltage to target values based on the selected valve. In an alternative embodiment, the controller 20 may control for a target or setpoint of frequency and current, or combinations thereof. The controller 20 monitors the VSD 12 to determine the current drawn by the motor 16 and records the output current vs. time. Optionally, the output current vs. time is graphed and presented to the user on the user interface 24. Once at the target voltage and frequency, the controller 20 maintains the output at the target values.

Next, in step 112, the controller 20 determines if the current drawn by the motor 16 (e.g., measured in amperes) has reached a predetermined forward stroke set point based on the selected valve. If the current has reached the predetermined forward stroke set point, the controller 20 signals the VSD 12 to stop. Otherwise, if the controller 20 determines that the current has not reached the predetermined set point, the controller 20 determines if the amps reached the reverse stroke set point before it was expected, step 116. The purpose of this check is to detect a valve which has operated in the wrong direction (going further open, when it was meant to go closed). This feature allows the portable drive to be wired to the motor A/C leads without consideration of phase alignment of the leads (phase alignment affects the direction of rotation of the three-phase motor). If the controller 20 determines the amps have not reached the reverse stroke set point before it was expected, the controller 20 maintains the VSD 12 at the target voltage and frequency. If the controller 20 determines the amps have reached the reverse stroke set point before it was expected, the controller 20 stops the VSD 12 and actuates an alarm via the user interface 24 (step 118). If such a condition occurred, an operator may re-evaluate the conditions to determine if the increase in current may have been caused by the valve hitting the backseat or some other failure. If it is concluded that the valve hit the backseat, the operator may simply direct the controller 20 to spin the motor 16 in the opposite direction.

The ability to control frequency with the VSD 12 is also useful at the instant of motor start. Generally, motor operated valves allow the motors to start unloaded by designing them such that they may turn 180 degrees before they engage the drive. As the motors are unloaded with a low rotational moment of inertia, the rotor rapidly accelerates to full speed. This has two effects 1) limits in-rush current because the motor reaches full speed before the current has a chance to reach the full inrush amount; and 2) the impact when the rotor engages the drive helps start the valve moving; this is referred to as the "hammer blow effect." Starting the motor at a frequency lower than 60 hz will decrease the hammer blow, and make the valve operator less effective. The portable motor drive system is configured to operate at normal speed to allow the armature to reach full speed before impact, preserving the hammer blow feature. The portable motor drive system 10 is also configured to allow for multiple hammer blows to help unseat a stuck valve (by reversing slowing until the back stop is reached and then accelerating forward at full speed). This feature may also be used to help seat a valve 18 which did not achieve the desired torque setting.

Figure 3:
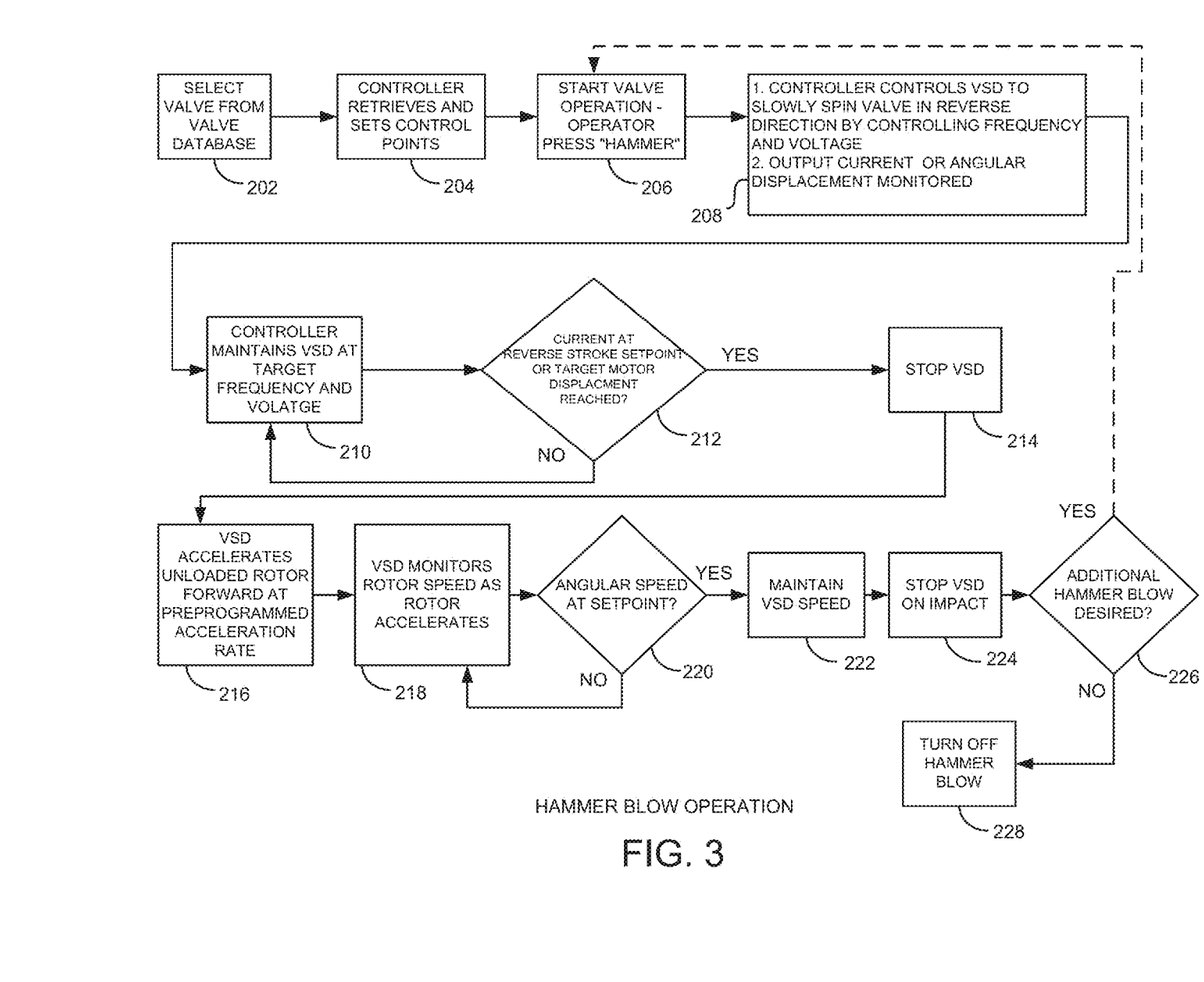
FIG. 3 is a flow chart illustrating a hammer blow operation of the portable motor drive system in accordance with an embodiment of the present disclosure.

Referring to FIG. 3, a flow chart illustrating a hammer blow operation of the portable motor drive system in accordance with an embodiment of the present disclosure is provided. Initially, in step 202, a valve is selected from the valve database via user interface 24. The controller 20 retrieves from memory 22 control set points for hammer blow for the selected valve, step 204. Next, in step 206, the user interface prompts the user to start the hammer blow operation of operating the valve.

In step 208, the controller 20 sends at least one control signal to the VSD 12 to slowly spin the motor 16 in a reverse direction by controlling the frequency and voltage. The controller 20 monitors the current drawn by the motor 16 or angular displacement. Once at the target voltage and frequency, the controller 20 maintains the output at the target values, step 210.

Next, in step 212, the controller 20 determines if the current drawn by the motor 16 (e.g., measured in amperes) has reached a predetermined reverse stroke set point or the target motor displacement has been reached based on the selected valve. If the current has reached the predetermined set point, the controller 20 signals the VSD 12 to stop, step 214. Otherwise, if the controller 20 determines that the current has not reached the predetermined set point (or programmed displacement achieved), the controller 20 maintains the VSD 12 at the target voltage and frequency.

It is to be appreciated that in steps 208-212, that the VSD 12, via commands of the controller 12, is controlling the valve motor 16 to spin slowly backwards. Initially, the drive ears on a main column of the valve assembly (i.e., one set of ears on the motor side and one set on the valve shaft) are in close contact. When the motor starts spinning backward, the ears are no longer in contact, with a gap between them opening as the motor spins backwards. The motor is spinning unloaded at this point. This process continues until the motor side drive ears have spun approximately less than 180 degrees. At this point, the motor 16 hits the reverse side of the drive ears; if this process is not interrupted, the valve motor 16 would spin in the reverse direction. However, since the controller 20 is controlling torque by either limiting amps or output voltage, when the motor ears do come in contact with back side of the drive ears, the controller 12 senses this condition as an increase in amps and stops the VSD 12 (as in step 214). Alternately, the controller 20 may count the number of motor turns, and stop before actual contact is made, or the voltage may be limited to a predetermined set point voltage, which limits torque, so the VSD 12 does not develop the torque to spin the valve after the ears engage. Regardless of the method employed, the motor can now turn 180 degrees in a forward direction, before the drive ears engage.

After the controller 20 has stopped the VSD 12, the controller 20 controls the VSD 12 to accelerate the unloaded rotor forward at a predetermined acceleration rate, step 216. It is to be appreciated that the predetermined acceleration rate may be based on several factors including valve size, how the valve is geared, etc. The controller 20 monitors the rotor speed as the rotor accelerates, step 218. In step 220, the controller 20 determines if the angular speed has reached a predetermined set point; if the controller 20 determines the angular speed has not reached the predetermined set point, the controller continues to monitor the rotor speed as the rotor accelerates.

If, at step 220, the controller 20 determines the predetermined angular speed has been reached, the controller 20 stops accelerating the motor, and thereafter maintains constant speed until impact the VSD 12, at step 222. When impact has been reached, the controller 20 stops the VSD 12. At step 226, the operator 20 determines if additional hammer blow is desired. If additional hammer blow is not desired, the operator discontinues hammer blow operation, step 228. Otherwise, the operator directs the controller 20 to returns to step 206 and the process is repeated. It is to be appreciated that multiple hammers blows may also be programmed to occur in sequence.

In the hammer blow process, the valve 18 can be backed up to the point where the ears are disengaged by the maximum distance (by approximately 180 degrees). At this point, the drive ears come in contact on their reverse sides. This is sensed by the portable motor drive as an increase in current, as the motor attempts to spin the valve in a reverse direction. In response to this condition, the unit is shut down in preparation for initiating the hammer blow. However, the hammer blow process may also be implemented in other ways. For example, the number of turns it takes to disengage the ears may be known. This information may be stored, for instance, in the memory 22. In this case, the controller 20 can instruct the VSD 12 to spin the motor a number of revolutions up to, or just before, the point at which the reverse side of the ears are hit. In this way, the motor be rotated and stopped precisely without hitting the reverse side.

Yet other implementations of the hammer blow process may be used. For example, the valve 18 may be large and have a large number of turns (e.g., 100) between the front and reverse sides of the ears. In this case, it may not be necessary to back the motor up to its extreme reverse condition. Instead, the controller 20 in this situation may instruct the VSD 12 to spin backwards a reasonable number of turns (e.g., 20) to allow the motor to perform an adequate hammer blow. These and other implementations may be selected by the user by selecting options displayed on the user interface 24.

It is to be appreciated that motor operated valves typically require significantly more torque to seat the valve (i.e., tightly close the valve), than it does to run the valve from an open position to the point the valve disc contacts the valve seat. At the point the valve disc contacts the seat, the valve offers more resistance to forward travel. This resistance to travel increases as the valve closes more tightly. Then, in general, the torque required to keep the valve moving in the closing direction increases roughly linearly with time. In typical application, this process will continue until the torque switch is actuated, which will de-energize the valve motor. As valve torque is roughly proportional to the amps demanded by the motor, the point of peak torque coincides with the point of peak amps.

Unlike a large AC bus powering typical motor operated valve, the current available from the portable motor drive system 10 is limited. For a portable motor drive system only powered by batteries, the AC current developed is directly related to the instantaneous current delivered by the batteries. As such, the peak torque developed by the portable motor drive system is directly related to the peak current output of the batteries.

If it is desired for a battery powered portable motor drive system to develop a certain quantity of torque, the battery will need to be sized such that it can produce the associated current at the instant of peak torque (i.e., which is only a brief instant). In essence, the battery is significantly underutilized for the majority of the valve stroke.

For example, in exemplary experiments, running current (i.e., the amps necessary to stroke the valve with the valve disc not in contact with the seat) for a preselected valve was approximately 2.5 amps. The stroke time for the predetermined valve would be approximately 30 second. At the instant the valve disc contacted the seat, current demand rapidly increased. At 33 second, a peak current of 19 amps (the limit of battery capability) was reached.

For this example, to develop this peak current of 19 amps, a battery weighing 21 kg is required. However, if we only wished to run the valve, a significantly smaller battery could be used. Roughly speaking, if the battery size was scaled down, the 2.5 amps necessary to run the valve could be supplied by a battery weighing approximately 4 kg.

An alternate to powering the portable motor drive system with a battery at the point the valve begins to torque down is to use a capacitor. Currently available capacitors have significantly greater power to weight ratios than currently available batteries, while batteries have better energy to weight ratios. Because the time it takes to torque a valve is relative short (e.g., 2 to 3 second), the energy consumed is small, the high power to weight ratio of a capacitor offers a significant advantage over batteries (i.e., the high energy storage capability of batteries is not needed for the application under consideration).

The amount of energy, or work, required to torque the above valve closed can be obtained by the following equation:

$$W = V \times I \times \Delta t$$

As current increased from 2.5 to 19 amp in 3 seconds, the average current over this period, the work required to torque the valve is approximately:

$$W = 480 \times (19 + 2.5) \times 3/2 = 15,480 \text{ J}$$

Note: Battery voltage dropped from 480 to 400 VDC as the valve current increased from 2.5 to 19 amps. To overestimate the work required, the voltage was assumed constant at 480 VDC.

As an alternative to using a battery to support the valve torque process, a capacitor may be used. If the capacitor is charged before the valve is operated the capacitor will initially be at 480 VDC. The minimum voltage the prototype system can operate is 400 VDC.

The energy stored in a capacitor can be expressed by the following equation:

$$W = \tfrac{1}{2} \times C \times V^2$$

As only the energy stored between 480 and 400 VDC is available, the energy available is the difference between the energy stored at 480 volts and that stored at 400 volts or:

$$J = \tfrac{1}{2} \times C \times (480^2 - 400^2)$$

Substituting in 15,480 J, and solving for C, the required capacitor size can be found:

$$C = 2 \times 15{,}480 / (480^2 - 400^2) = 0.11 \text{ Farad.}$$

A capacitor of 0.11 Farad would weigh approximately 1 kg to 2 kgs. As such, the main components of a hybrid system using both batteries and capacitors, capable of running and closing the valve under consideration would be approximately 6 kg. Although additional components will be required, it is clear the capacitor/battery hybrid system will be significantly lighter than a system based on batteries alone (21 kg).

FIGS. 4-7 illustrate a simplified configuration of a hybrid system 400 having a capacitor assisted DC power supply. The main components are a battery 402, a main capacitor 404, and a pre-charge circuit that includes a resistor 406 and a pre-charge contact 408. The pre-charge circuit may be used to charge the main capacitor 404 from the battery 402. The hybrid system 400 also includes a relay 410 to switch the capacitor 404 into the circuit at the appropriate time, a current sensing device 412 to sense when the capacitor 404 needs to be switched in (based on increasing current), and a diode 414 downstream of the battery 402 to prevent back feeding the battery 402 when the capacitor 404 is switched in.

As an alternate to using a current sensor 412 to detect when the capacitor needs to be aligned, an under voltage sensor may be used to sense when DC bus voltage drops due to increasing load. As an alternate to using the pre-charge resistor 406, the VSD may be used to limit the rate the capacitors are charged through the batteries.

Figure 4:
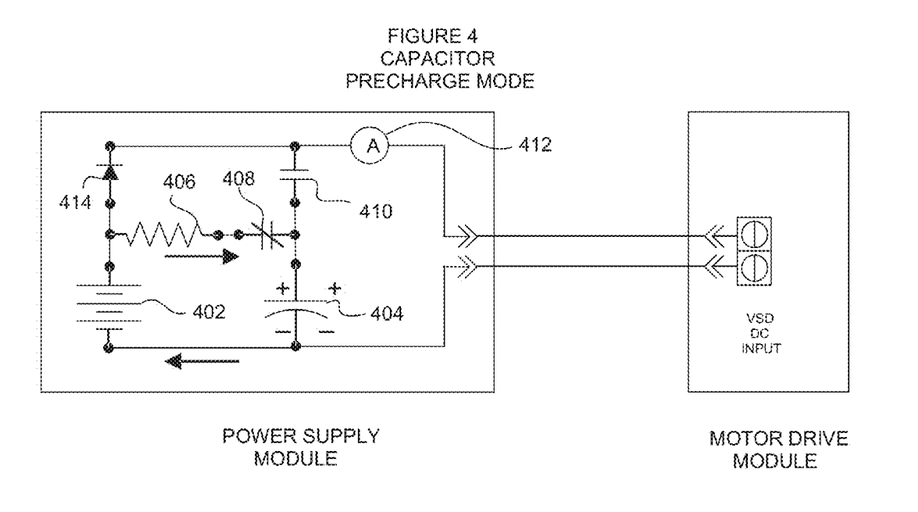
FIG. 4 is a diagram of a capacitor employed to boost the power capability in a portable motor drive system in accordance with an embodiment of the present disclosure, where the capacitor is in a pre-charge mode.
Figure 5:
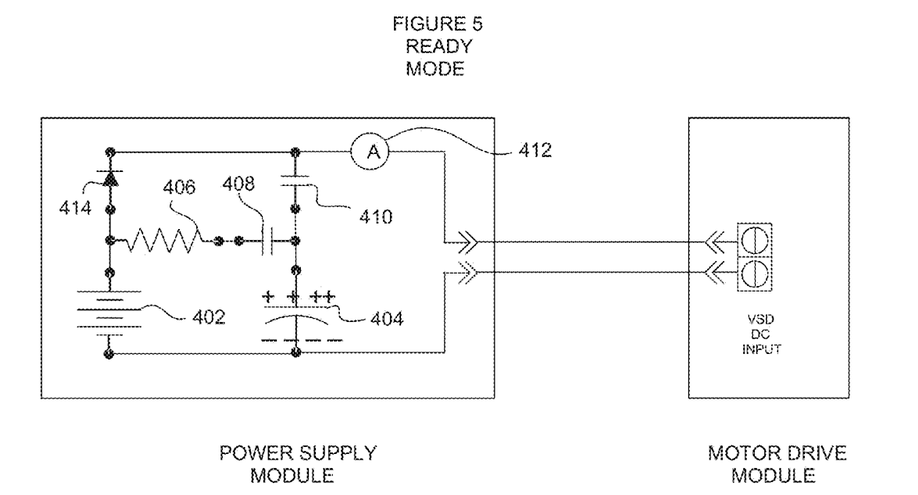
FIG. 5 is a diagram of a capacitor employed to boost the power capability in a portable motor drive system in accordance with an embodiment of the present disclosure, where the capacitor is in a ready mode.
Figure 6:
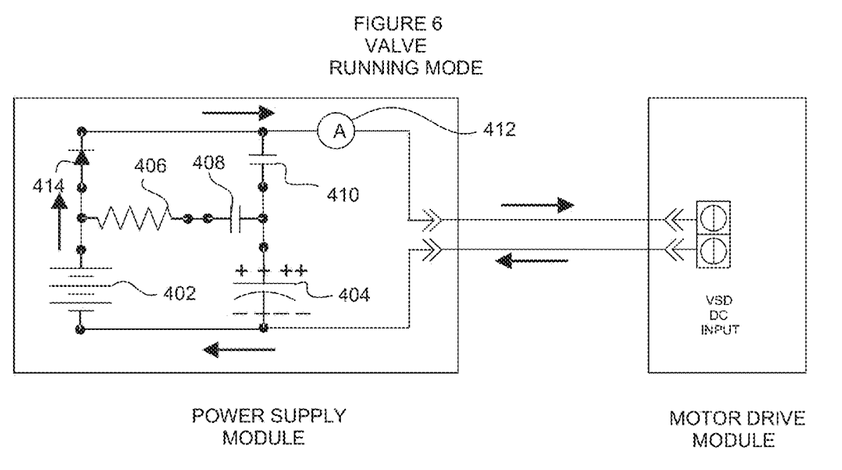
FIG. 6 is a diagram of a capacitor employed to boost the power capability in a portable motor drive system in accordance with an embodiment of the present disclosure, where the capacitor is in a valve running mode.
Figure 7:
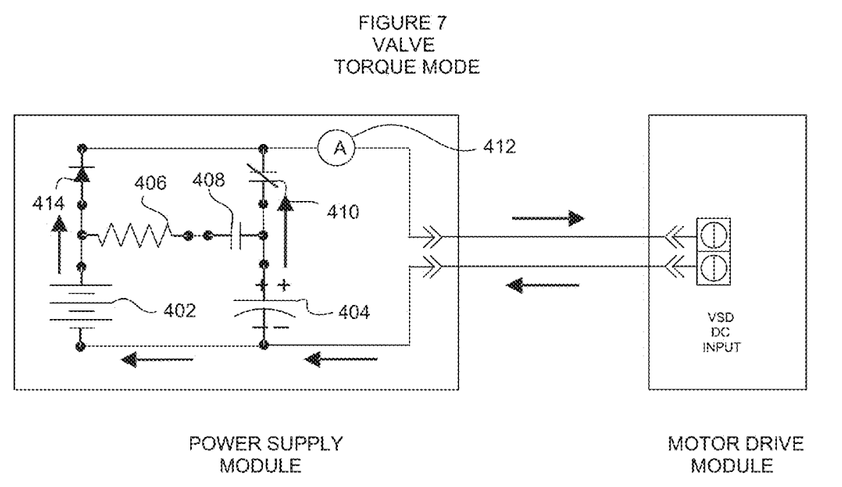
FIG. 7 is a diagram of a capacitor employed to boost the power capability in a portable motor drive system in accordance with an embodiment of the present disclosure, where the capacitor is in a valve torque mode.

Referring to FIGS. 4-7, the following describes the sequence of operation. Initially, the contact 410 in the pre-charge circuit is closed allowing the capacitor 404 to charge, as shown in FIG. 4. The resistor 406 in the circuit limits the current to a level within the capability of the battery 402. When the capacitor 404 is fully charged, the pre-charge contact 408 is opened and the system is in ready mode, as shown in FIG. 5. The capacitor 404 is shown as being charged in FIG. 5. When it is desired to operate the system, the VSD is started, as shown in FIG. 6. Initially only the battery 402 will be used (this preserves energy in the capacitor). When the valve begins to torque down, as shown in FIG. 6, the current increase. This will be sensed directly as an increase in current or indirectly as a decrease in bus voltage. In either case, the capacitor's relay 410 connecting the capacitor 404 to the DC bus will be closed, allowing the capacitor to power the drive. Initially, little current will come from the battery, but as capacitor voltage drops, as charge is taken from the capacitor 404, the battery 402 will also contribute to available current. The system will automatically shutdown (through action of the VSD) when the A/C current set point is reached.

Capacitors may also be used as the energy source for running a valve. For the valve operator under consideration the total Joules consumed in a 30 second stroke would be:

$$W = 480 \times 2.5 \times 30 = 3600 \text{ J}$$

This quantity of energy plus the energy to torque the valve (15,800 J) is well within the capability of currently available capacitors (52,000 J).

With respect to FIGS. 4-7, the current sensing device 412 may be replaced by Hall effect sensors that are built into the VSD 12. In this sense, the Hall effect sensors may be configured to sense increasing current to determine when the battery 402 might be switched in to supply additional power.

An alternate, a hybrid system could be built which strictly uses capacitors to drive the valve, with a battery only used to charge a bank of capacitors. After the capacitors are charged, the capacitors could be reconfigured in series to obtain the desired voltage. Such a system could offer weight economy, as a battery voltage can be a fraction of the voltage required to operate the motor operator (i.e., allowing a smaller battery). An additional advantage of the system is that the system can be operated in a pulse mode. The valve can be operated until the capacitor is depleted, and then the capacitor could be re-charged. Such a system would economize on capacitor size as well further reducing the weight of the system. Further, a system of this nature requires relatively small batteries, as the battery power can be less than that necessary to operate the valve.

Figure 8:
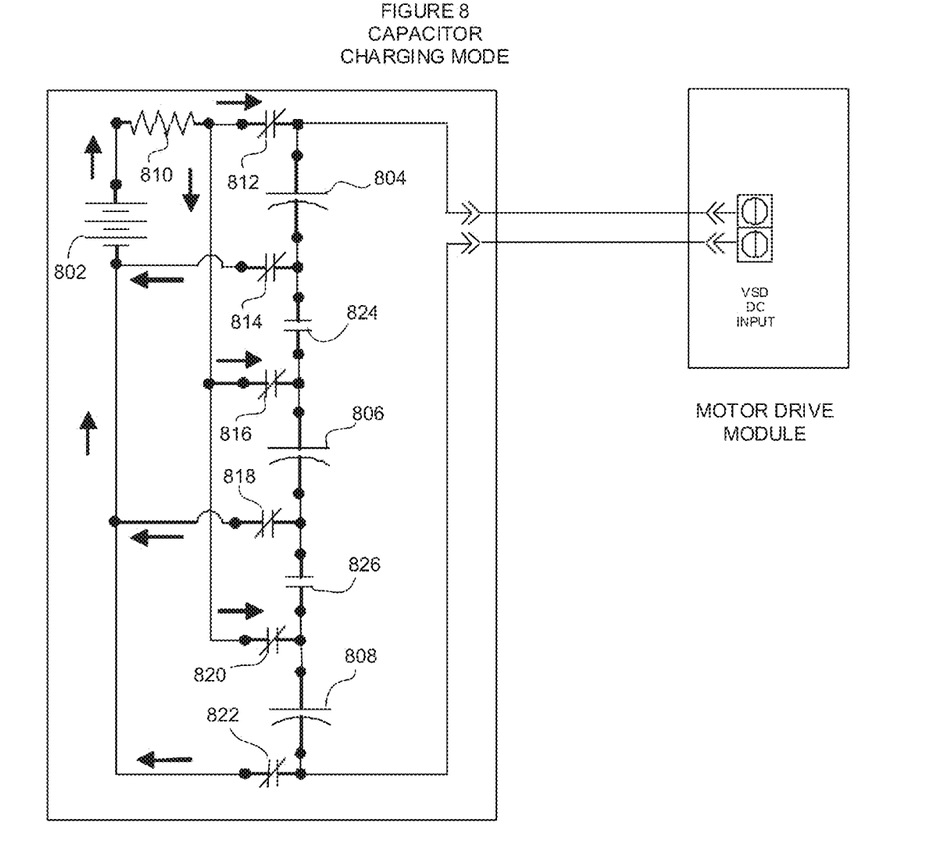
FIG. 8 is a diagram of a capacitor employed as the motive power source in a portable motor drive system in accordance with an embodiment of the present disclosure, where the portable motor drive is in a charging mode.
Figure 9:
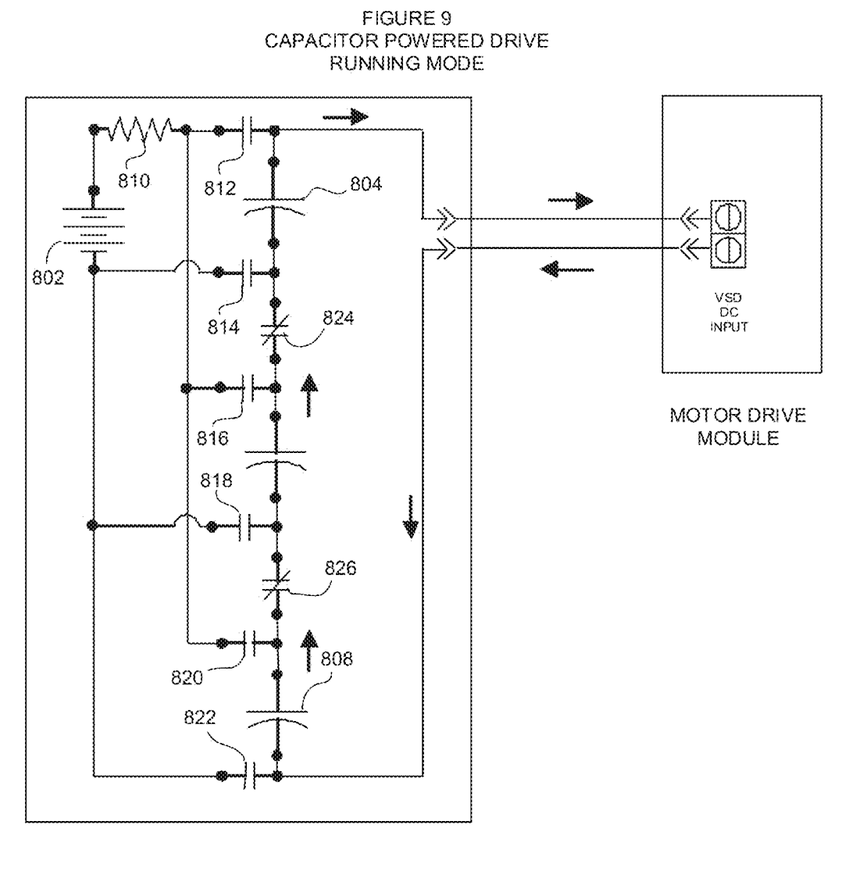
FIG. 9 is a diagram of a capacitor employed as the motive power source in a portable motor drive system in accordance with an embodiment of the present disclosure, where the portable motor drive is in a running mode.

FIGS. 8 and 9 show an arrangement of such a system. FIG. 8 shows the system in a charging mode where the capacitors 804, 806, and 808 are being charged. In this mode the battery 802 charges each capacitor in parallel, until the capacitors are fully charged (to battery voltage). Switches 812, 814, 816, 818, 820, and 822 are configured in the circuit to connect the capacitors in parallel during a charging mode. When fully charged, the operator will receive a ready signal, indicating the unit is ready to run.

FIG. 9 shows the system re-configured to support operation of the valve when the capacitors are discharged to provide power to the motor drive. After the capacitors are charged, the charging circuit switches 812, 814, 816, 818, 820, and 822 is disconnected and the capacitors 804, 806, and 808 are aligned in series by closing switches 824 and 826. In the embodiment shown, the operating voltage of the DC supply by the capacitors would be three times that of the battery 802 which charges the capacitors. With the capacitors aligned to the VSD, the system operates in a similar fashion as it would with a large battery (including automatic shutdown when the required torque is developed).

Should the capacitors become depleted before the valve operation is complete, the VSD has an under-voltage cut-out. If during operation of the VSD the capacitor voltage drops below an acceptable level the VSD will shutdown, and provide an alert to the operator to the condition. The operator would then reconfigure the system in the capacitor charging configuration, and re-charge the capacitors to prepare for continued operation of the machine.

The descriptions of VSD operation have described initially open valves being driven in a closed direction. Generally, it takes more torque to seat a valve than to unseat it, as such this system may also be used to open closed valves. For a device which strictly runs on batteries, or strictly runs on capacitors, the manner in which the machine is operated will be identical (with the VSD turning off when the valve reaches the back seat). Either of these machines will automatically provide the torque necessary to move the valve off its seat.

However, the capacitor assist DC source, will need to be operated slightly differently to develop the torque necessary to move the valve off the seat. To move the valve off the seat, the capacitor will be paralleled with the battery when the VSD is started. This will ensure the sufficient current is available to support the initial high torque demand. Once the valve has begun to travel, the capacitor may be taken out of the circuit, with the battery alone running the valve. Although not necessarily required, this operating strategy preserves capacitor capacity, for subsequent operation of the VSD.

Another implementation of the portable motor drive system 10 includes attaching a compressed air tank on the backpack. Therefore, if a person is needed in a facility that has been devastated by a disaster, such as in the case of the Fukushima disaster, the air may be too contaminated to breath. The compressed air tank can then be used to provide breathable air to the worker as needed. The tank may be incorporated in the housing 26, in a backpack, in a suitcase-type structure, or in other types of portable devices. The tank may be integral with the portable motor drive system 10. Because capacitor-based power supply provides a lighter load, the extra weight of an air tank would still be manageable for a person.

In some embodiments, if additional power is needed, the portable motor drive system 10 (along with various optional components, such as the power source 14, air tanks, etc.) may be separated in to multiple portable devices, configured to be carried or rolled by more than one person. For example, the battery size required to run a 23 HP valve may require a 700 VDC battery. Such a battery would be split in two 350 VDC parts.

It is to be understood that the present disclosure may be implemented in various forms of hardware, software, firmware, special purpose processors, or a combination thereof. The system 10 also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, or firmware, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

It is to be appreciated that the various features shown and described are interchangeable, that is, a feature shown in one embodiment may be incorporated into another embodiment.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '________' is hereby defined to mean . . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A drive system for operating a valve in an emergency situation, the drive system comprising:
   a portable housing;
   a user interface configured to receive at least one user input;
   a memory configured to store at least one operating frequency and at least one operating voltage for driving a valve motor of a valve, the valve motor and valve external to the portable housing;
   a controller disposed within the portable housing, the controller configured to receive the at least one user input from the user interface and retrieve the at least one operating frequency and at least one operating voltage from the memory based on the received at least one user input;
   a variable speed drive disposed within the portable housing, the variable speed drive configured to drive the valve motor for operating the valve, wherein the controller is configured to control the variable speed drive to drive the valve motor at the at least one operating frequency and at least one operating voltage, and
   a power supply disposed within the portable housing, the power supply providing power to the variable speed drive, wherein the power supply is a hybrid system including a battery pack having a high energy-to-weight ratio and at least one capacitor having a high power-to-weight ratio, wherein the battery pack is configured to supply power at a first power level and the at least one capacitor is configured to supply power at a second power level,
   wherein the controller is configured to control the power supply to supply power to the variable speed drive to drive the valve motor for operating the valve.

2. The drive system of claim 1, wherein the controller is contained in the variable speed drive.

3. The drive system of claim 1, wherein the controller is further configured to monitor the output current of the variable speed drive to determine torque imposed on the valve.

4. The drive system of claim 3, wherein the controller is configured to control the power supply to shut off power to the variable speed drive when a predetermined output current, indicative of a desired torque, is detected.

5. The drive system of claim 4, wherein the power supply shuts off power without the assistance of a torque switch.

6. The drive system of claim 1, wherein the controller is further configured to maintain the variable speed drive at the at least one operating frequency and at least one operating voltage until a forward stroke set point or reverse stroke set point of the valve motor is reached.

7. The drive system of claim 1, wherein the controller is further configured to control the variable speed drive to seat or unseat the valve during an intentional hammer blow mode, wherein the valve motor includes a rotor and the valve includes a drive, the rotor engaging the drive to turn the valve, and during the intentional hammer blow mode the controller selectively controls the operating frequency and operating voltage that the variable speed drive drives the valve motor with to cause the rotor of the valve motor to accelerate toward and impact the drive of the valve from an unloaded position one or more times.

8. The drive system of claim 1, wherein the power supply includes a plurality of capacitors that are charged by the battery pack during a charging mode.

9. The drive system of claim 8, further comprising:
a pre-charge contact configured to switchably couple the battery pack to the plurality of capacitors during the charging mode; and
a capacitor switching contact configured to switchably couple the plurality of capacitors to the variable speed drive during a seating/unseating mode.

10. The drive system of claim 9, further comprising a current sensing device configured to switchably uncouple the plurality of capacitors from the variable speed drive when an increase in current is detected during the seating/unseating mode.

11. The drive system of claim 8, wherein the battery pack is configured to charge the capacitors when the capacitors are in parallel, and wherein the capacitors are configured to provide power to the variable speed drive when the capacitors are in series.

12. The drive system of claim 11, further comprising:
a first set of switches configured to connect the capacitors in parallel when the capacitors are being charged;
a second set of switches configured to connect the capacitors in series when the capacitors provide power to the variable speed drive.

13. The drive system of claim 1, wherein the user interface receives at least one second user input associated with at least one second operating frequency and at least one second operating voltage and the controller is configured to control the variable speed drive to drive the valve motor at the at least one second operating frequency and at least one second operating voltage based on the at least one second user input.

14. The drive system of claim 1, wherein the controller is configured to control the power supply to supply power to the variable speed drive at the first power level to operate the selected valve during normal operation and to control the power supply to supply power to the variable speed drive at the second power level to seat or unseat the selected valve, the second power level being higher than the first power level.

15. The drive system of claim 1, wherein the battery pack supplies power at the first power level for a longer time than the at least one capacitor supplies power at the second power level.

16. The drive system of claim 1, wherein the portable housing comprises a first module that houses the user interface, controller, and variable speed drive and a second module that houses the power supply.

17. The drive system of claim 1, wherein the valve is designed to operate with a torque switch, and wherein the at least one operating frequency and at least one operating voltage corresponds to preprogrammed torque limits of the valve to enable the variable speed drive to operate the valve without a torque switch.

18. The drive system of claim 1, wherein the at least one operating frequency and at least one operating voltage are reduced with respect to conventional operating levels to prevent damage to the selected valve.

19. The drive system of claim 1, wherein the drive system is configured to be utilized as a temporary motor control device during an emergency situation when conventional motor controller systems are inoperable, and wherein the weight of the drive system enables a human to handle the drive system for temporary replacement of the inoperable motor controller systems.

20. A drive system for operating a valve in an emergency situation, the drive system comprising:
a portable housing;
a user interface at least partially disposed within the portable housing, the user interface enabling a user to select a valve from a plurality of valves, each of the plurality of valves being external to the portable housing and configured to control the flow of a fluid;
a memory configured to store respective operating frequencies and operating voltages corresponding to each of the plurality of valves;
a controller disposed within the portable housing, the controller configured to receive input from the user interface regarding a selected valve, the controller further configured to retrieve an operating frequency and an operating voltage corresponding to the selected valve from the memory based on the received input; and
a variable speed drive disposed within the portable housing, the variable speed drive configured to drive a valve motor for operating the selected valve, the valve motor external to the portable housing, wherein the controller is configured to control the variable speed drive to drive the valve motor at the operating frequency and operating voltage of the selected valve;
a power supply disposed within the portable housing, the power supply providing power to the variable speed drive, wherein the power supply is a hybrid system including a battery pack having a high energy-to-weight ratio and at least one capacitor having a high power-to-weight ratio, wherein the battery pack is configured to supply power at a first power level and the at least one capacitor is configured to supply power at a second power level,
wherein the controller is configured to control the power supply to supply power to the variable speed drive to drive the valve motor for operating the valve.

* * * * *